Patented Oct. 4, 1932

1,880,572

UNITED STATES PATENT OFFICE

BRUNO WENDT, OF DESSAU IN ANHALT, AND HANS BINCER, OF DESSAU-ZIEBIGK IN ANHALT, GERMANY, ASSIGNORS TO AGFA ANSCO CORPORATION, OF BINGHAMTON, NEW YORK, A CORPORATION OF NEW YORK

COLOR PHOTOGRAPHY

No Drawing. Application filed July 29, 1930, Serial No. 471,590, and in Germany September 9, 1929.

Our present invention relates to an improvement in the color photography and more particularly to the bleaching-out process. One of its objects is to provide bleaching-out dyes having nearly the same bleaching-out velocity.

Other objects of our invention may be seen from the specification following hereafter.

Attempts have been made to apply dye-stuffs of various classes to the production of bleaching-out layers as, for instance, flavinduline, rosinduline 2 B (cf. Schultz "Farbstofftabellen" 6th edition, No. 673), Capri blue GON (cf. Schultz "Farbstofftabellen", 6th edition, No. 620), methylene blue and erythrosine. However, there has been no real success because most of the dyestuffs suggested for the purpose have been not sensitive enough, and among the few highly sensitive dyestuffs, as for instance, those stated above, the dyestuffs have not the same bleaching-out velocity in all the three primary colors.

According to this invention, the bleaching-out velocity of dyestuffs is adjusted for the purpose in question, that is to say, it is increased or reduced by hydrogenation or by the introduction of certain substituents into the aromatic residues linked directly or indirectly to the chromogen. The substituents have the same effect in all classes of dyestuffs. Thus, the hydrogenation or the introduction of a halogen or of a CN-, CNS-, nitro, carbonyl- (CO.H, CO.R) or carb-alkoxy-group (CO.OR) into the bleaching-out dye-stuffs, enhances the bleaching-out velocity, whereas the introduction of alkyl-, aryl-, hydroxy-, aryloxy- or alkyloxy-groups reduces the same. The alteration of the bleaching-out velocity is influenced by the position of the said substituents in the aryl group. For increasing the velocity ortho- or meta- position; for reducing the velocity, para-position is most favorable. As a rule, the activity rises with the higher homologues.

By our invention it becomes possible to give to a dye a definite light sensitivity or bleaching-out velocity without substantially changing its shade. This is especially useful for preparing the bleaching-out material for photographic multi-color printing work.

As is well known to those skilled in the art, this material an early representative of which was the so-called Utocolor paper consists of a suitable paper support bearing a colloid layer into which is incorporated a plurality of light sensitive dyes in the three primary colors, viz. blue, yellow and red. These dyes bleach out under the action of light of the same wave-range they absorb, their light sensitivity being activated by addition of suitable substances, for instance, thioallyl-urea acting as "acceptor". When exposed to light behind an original picture in colors, for instance, an autochrome plate or a color print, there is produced in the bleaching-out layer a positive picture in the true colors of the original. One of the chief obstacles which prevented this printing process from being introduced in photographic practice, resided in the fact that nearly all dyes have different bleaching-out velocities and that it was practically impossible to provide a plurality of dyes with approximately the same bleaching-out velocity-value. By our new process, however, we succeed in harmonizing the velocities of any chosen triad of dyes without substantially changing their other characteristics. If, for example, there are a blue dye of the velocity value 6, a yellow dye of the value 4 and a red dye of the value 2, we introduce a decreasing radicle into the blue dye and an increasing radicle into the red dye until both dyes approximately assume the velocity value 4, which the yellow dye possesses.

The term "introduction of a radicle" does not mean the operation of substitution in the usual sense of the chemist but it comprises generally any of the well-known methods of organic chemistry which is liable to yield a dye of the formula required. If, as in most cases, direct chemical substitution in the proper sense is impossible at the place required, the substituted dye is prepared by a suitable method of synthesis, for instance, by choosing correspondingly substituted starting materials.

According to this invention, these facts are utilized in order to adjust the differing between the bleaching velocities of several dyestuffs in the primary colors, when manufacing multi-colored bleaching-out layers.

The following examples, given by way of illustration, show in what manner the bleaching-out velocity of dyestuffs can be altered. In the left hand column the original bleaching-out dyes are indicated, while the right hand column shows the substituted dyes having another bleaching-out velocity and being thus adjustable with other bleaching-out dyes in order to be used in manufacturing light-sensitive layers for multicolor prints in which the different dyes are evenly bleached-out during the printing operation. At every substituted dye a factor is mentioned indicating the degree of alteration of the bleaching-out velocity compared with that of the original dye in the left hand column.

(1) *Increase of the sensitiveness*

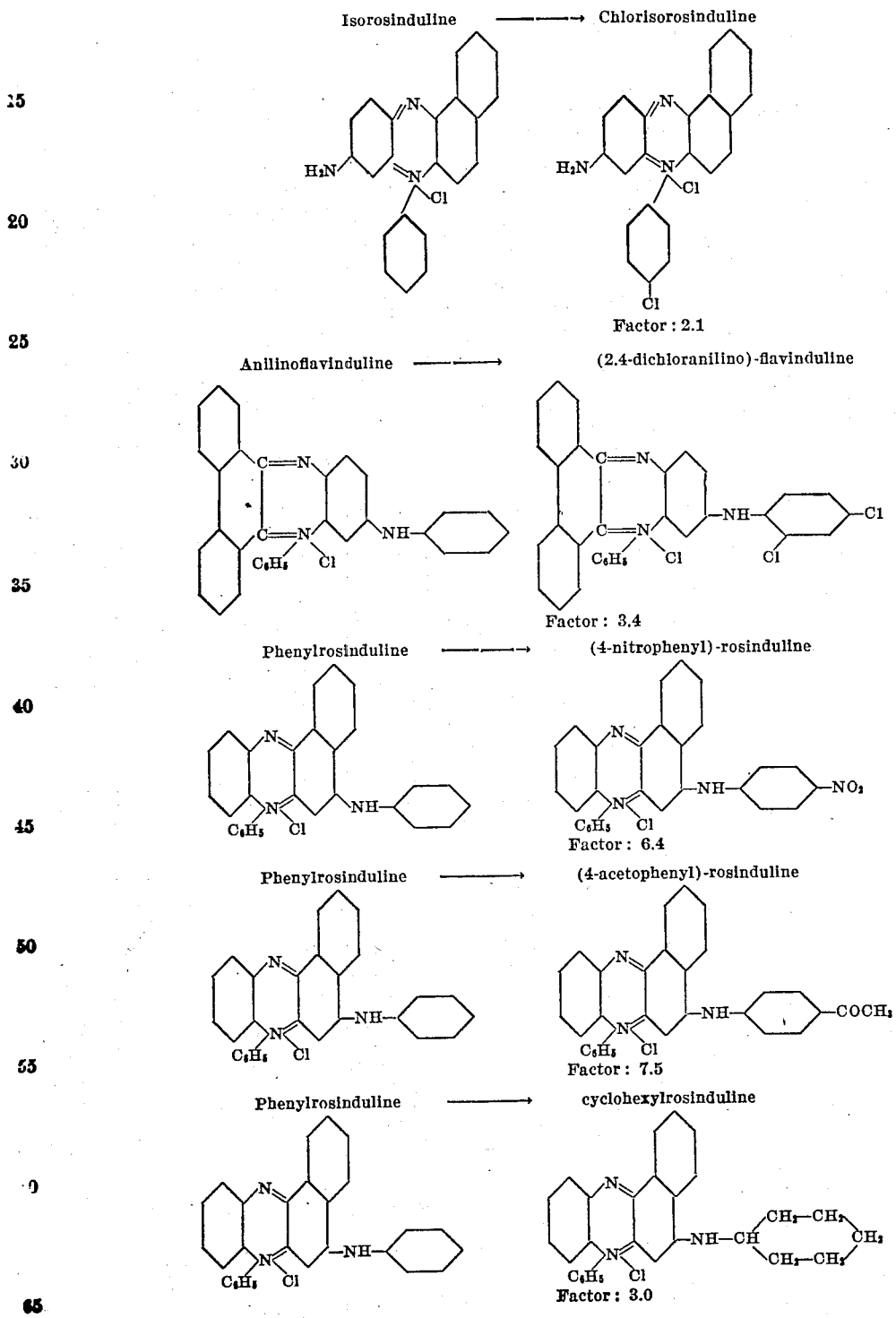

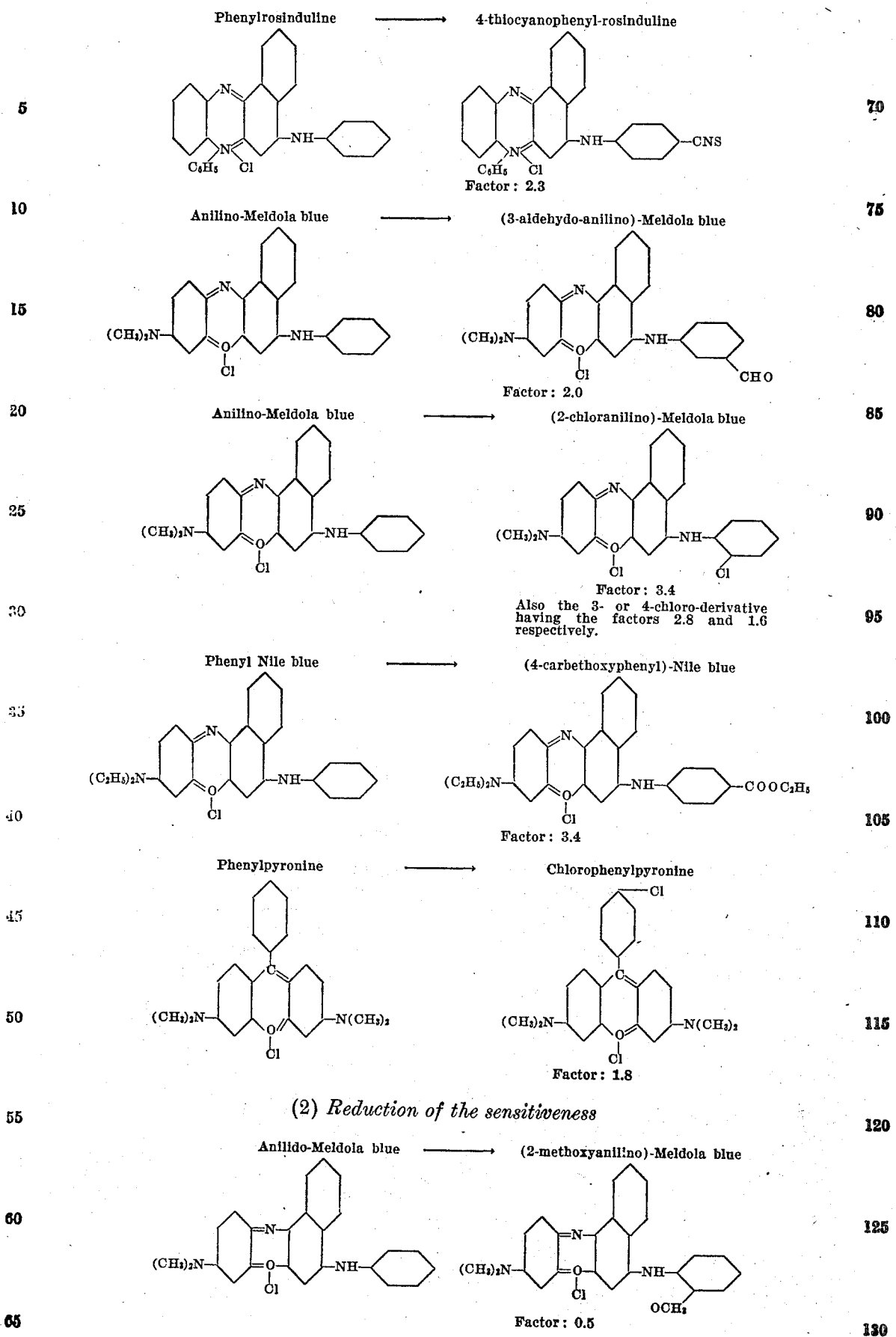
(2) *Reduction of the sensitiveness*

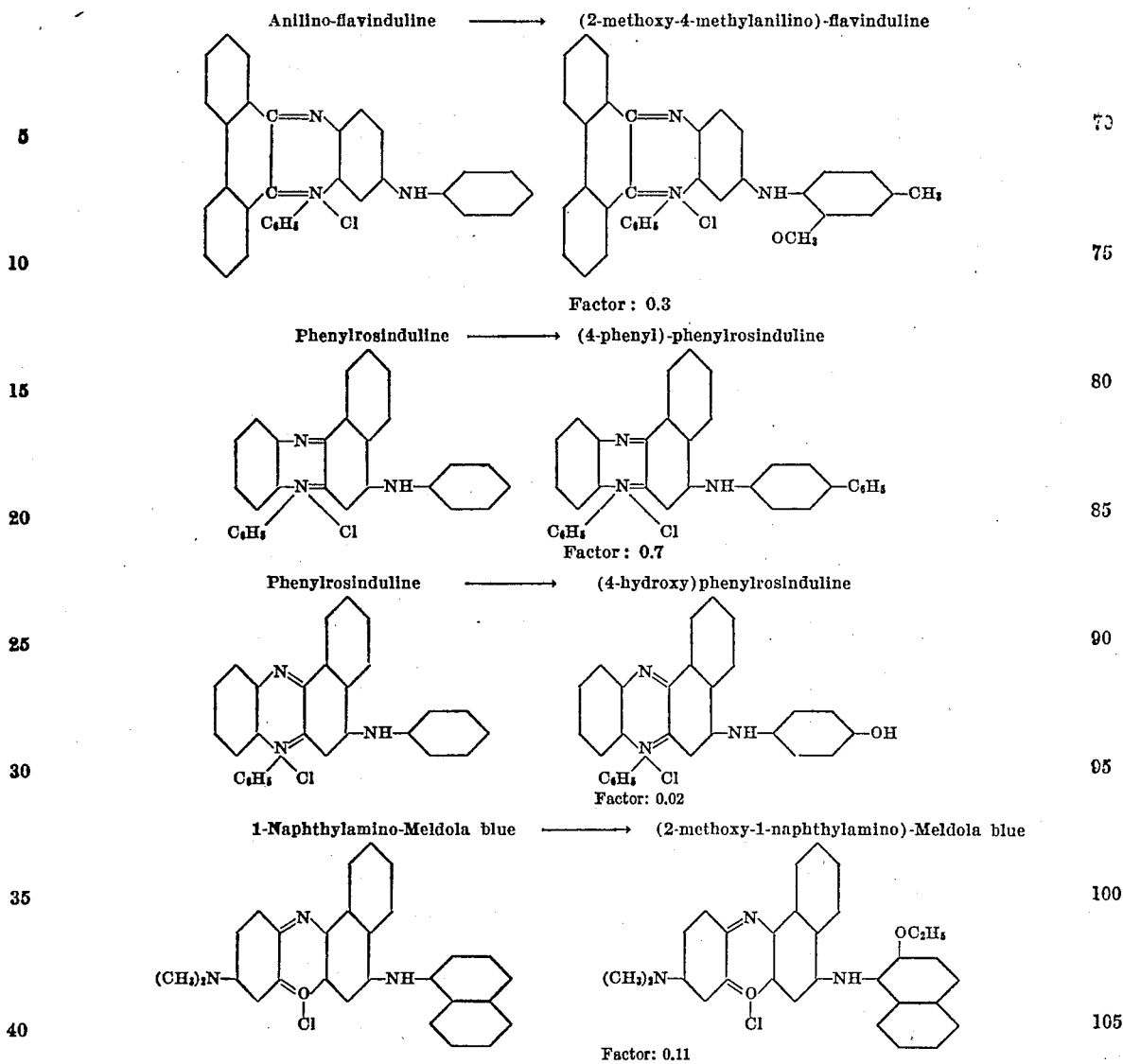

In literature (see for instance "Zeitschrift für wissenschaftliche Photographie," 1926, page 318), indications may be found concerning the influence of substituents in bleaching-out dyes upon the bleaching-out velocity. Thus, for instance, the methyl and methoxy-group and the halogens, likewise, shall enhance the bleaching-out velocity, while the nitro group shall have a reversed influence. In this case, however, dyes were examined substituted in the chromogen itself and a regularity in the action of certain substituents does not exist. When introducing, for instance, halogen in the para-position to the azine-nitrogen of phenylrosinduline the bleaching-out velocity of the dye is enhanced while when introducing it in the correspondent position of Meldola blue the bleaching-out velocity is diminished. The possibility to influence regularly and to harmonize the bleaching-out velocity of dyes by substitution or hydration not in the chromogen itself, but in the aromatic radicles linked directly or indirectly to the chromogen, was unknown until now and dyes substituted in this manner were not suggested as useful in manufacturing light sensitive layers.

The above mentioned dyestuffs contain as chromophors one of the nuclei of the formulæ

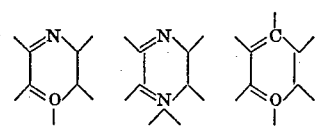

It is obvious however that other dyes well known in the manufacture of bleaching-out layers and containing other chromophors may likewise be altered with respect to their bleaching out velocity according to the rules given above. These modifications are considered to be equivalents of the process covered by the claims following hereafter.

What we claim is:—

1. Process for the production of layers of bleaching-out dyes, having a bleaching-out velocity as equal as possible, for the purpose of color photography comprising adjusting the bleaching-out velocity of the aromatically substituted dyestuffs containing a chromophor of the group consisting of nuclei of the formulæ

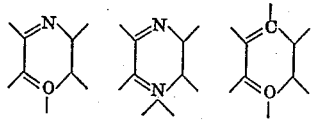

contained in said layers, by substituting at least one of the dyestuffs having an unsatisfactory bleaching-out velocity by a dyestuff having the same basic formula, wherein, however, the aromatic residue linked to the chromogen is hydrogenated or substituted by halogen, —CN, —CNS, —NO$_2$, —CO.H, —CO.R, —CO.OR, —OH, —alkyl, —aryl, —alkyloxy, or aryloxy.

2. Process for the production of layers of bleaching-out dyes, having a bleaching-out velocity as equal as possible, for the purpose of color photography comprising adjusting the bleaching-out velocity of the aromatically substituted dyestuffs containing a chromophor of the group consisting of nuclei of the formulæ

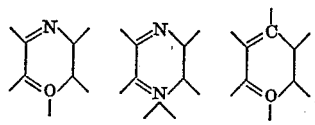

contained in said layers, by substituting at least one of the dyestuffs having a too low bleaching-out velocity by a dyestuff having the same basic formula, wherein, however, the aromatic residue linked to the chromogen is hydrogenated or substituted by halogen, —CN, —CNS, —NO$_2$, —CO.H, —CO.R or —CO.OR.

3. Process for the production of layers of bleaching-out dyes, having a bleaching-out velocity as equal as possible, for the purpose of color photography comprising adjusting the bleaching-out velocity of the aromatically substituted dyestuffs containing a chromophor of the group consisting of nuclei of the formulæ

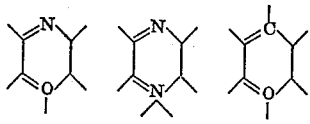

contained in said layers, by substituting at least one of the dyestuffs having a too high bleaching-out velocity by a dyestuff having the same basic formula, wherein, however, the aromatic residue linked to the chromogen is substituted by —OH, —alkyl, —aryl, —alkyloxy or aryloxy.

4. Layers of bleaching-out dyes for the purpose of color photography, produced according to the process claimed in claim 1.

5. Layers of bleaching-out dyes for the purpose of color photography, produced according to the process claimed in claim 2.

6. Layers of bleaching-out dyes for the purpose of color photography, produced according to the process claimed in claim 3.

In testimony whereof, we affix our signatures.

BRUNO WENDT.
HANS BINCER.